(No Model.) 3 Sheets—Sheet 1.
J. A. McKENZIE.
Velocipede.
No. 241,395. Patented May 10, 1881.
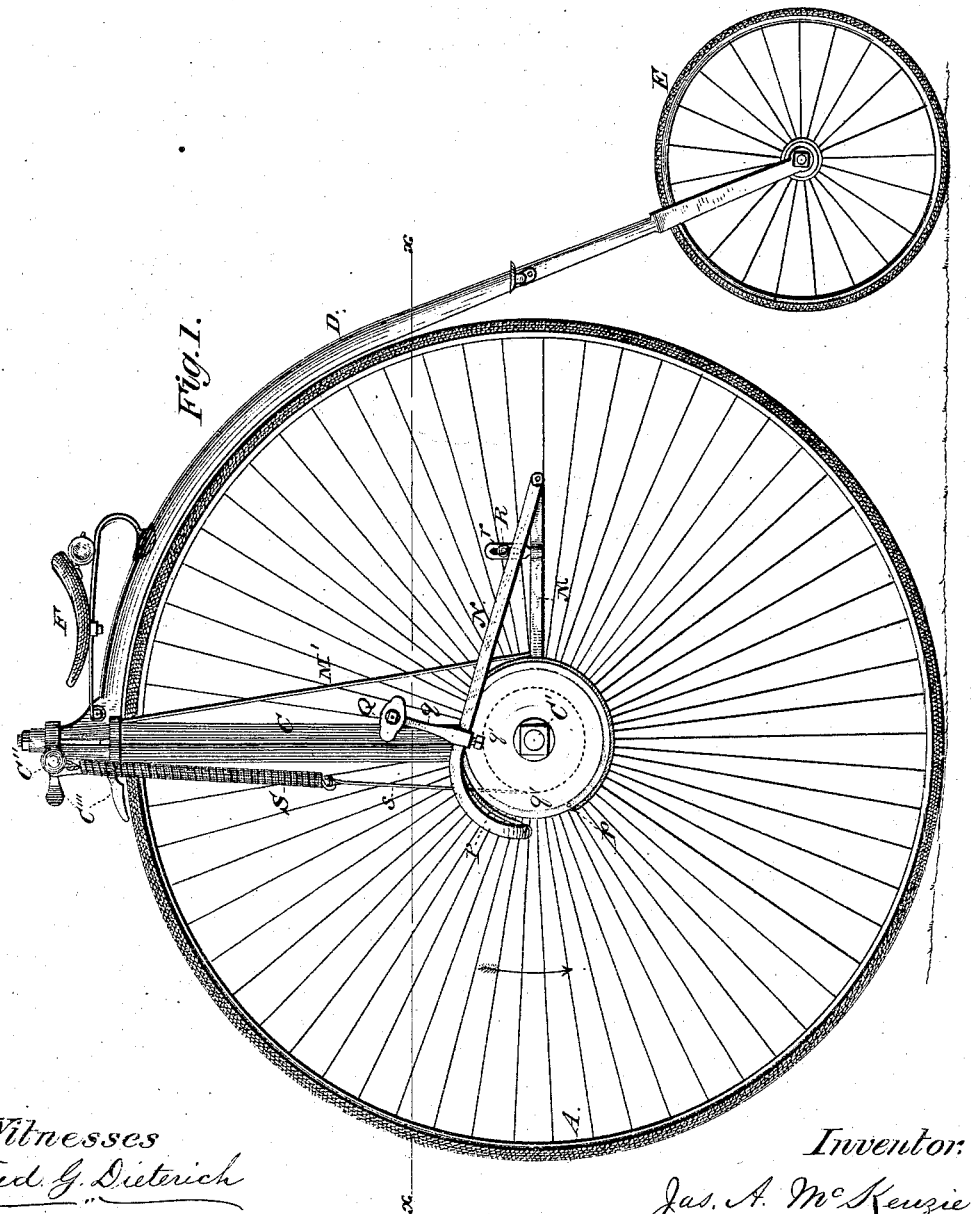
Fig. I.
Witnesses
Fred. G. Dieterich
P. C. Dieterich
Inventor:
Jas. A. McKenzie
By W. B. Richards
Atty.

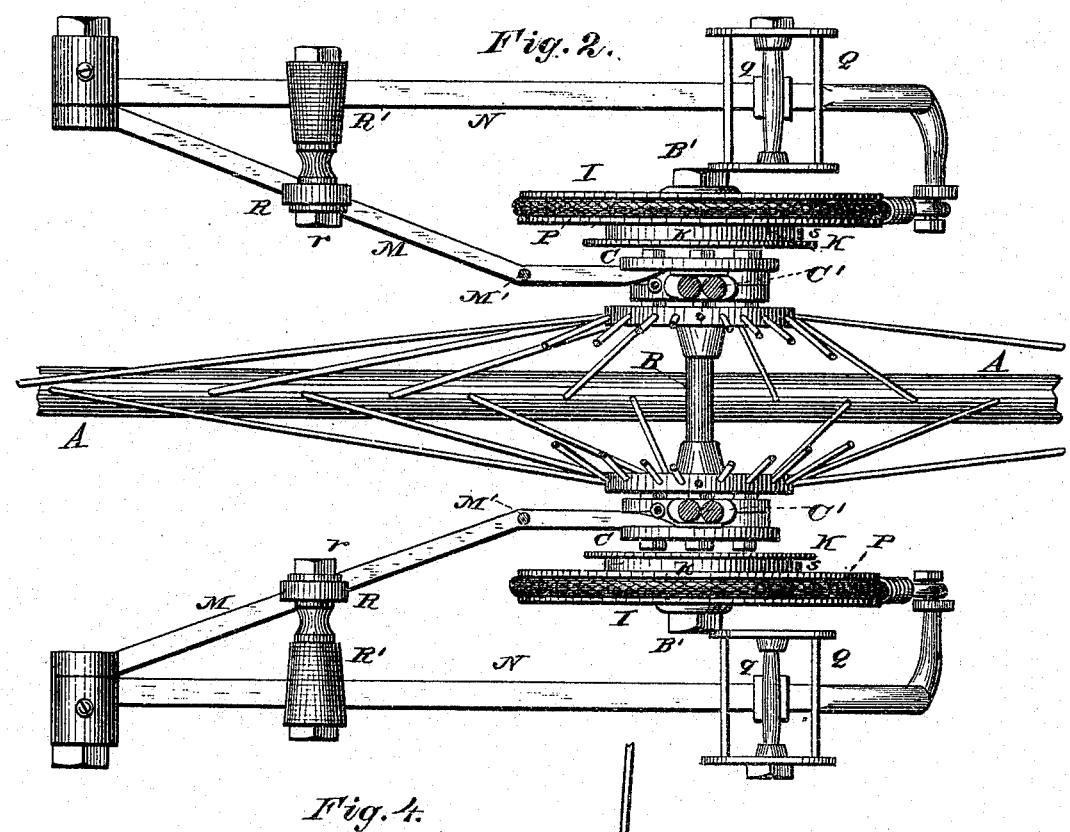

(No Model.)  
J. A. McKENZIE.  
Velocipede.  
No. 241,395. Patented May 10, 1881.
3 Sheets—Sheet 3.
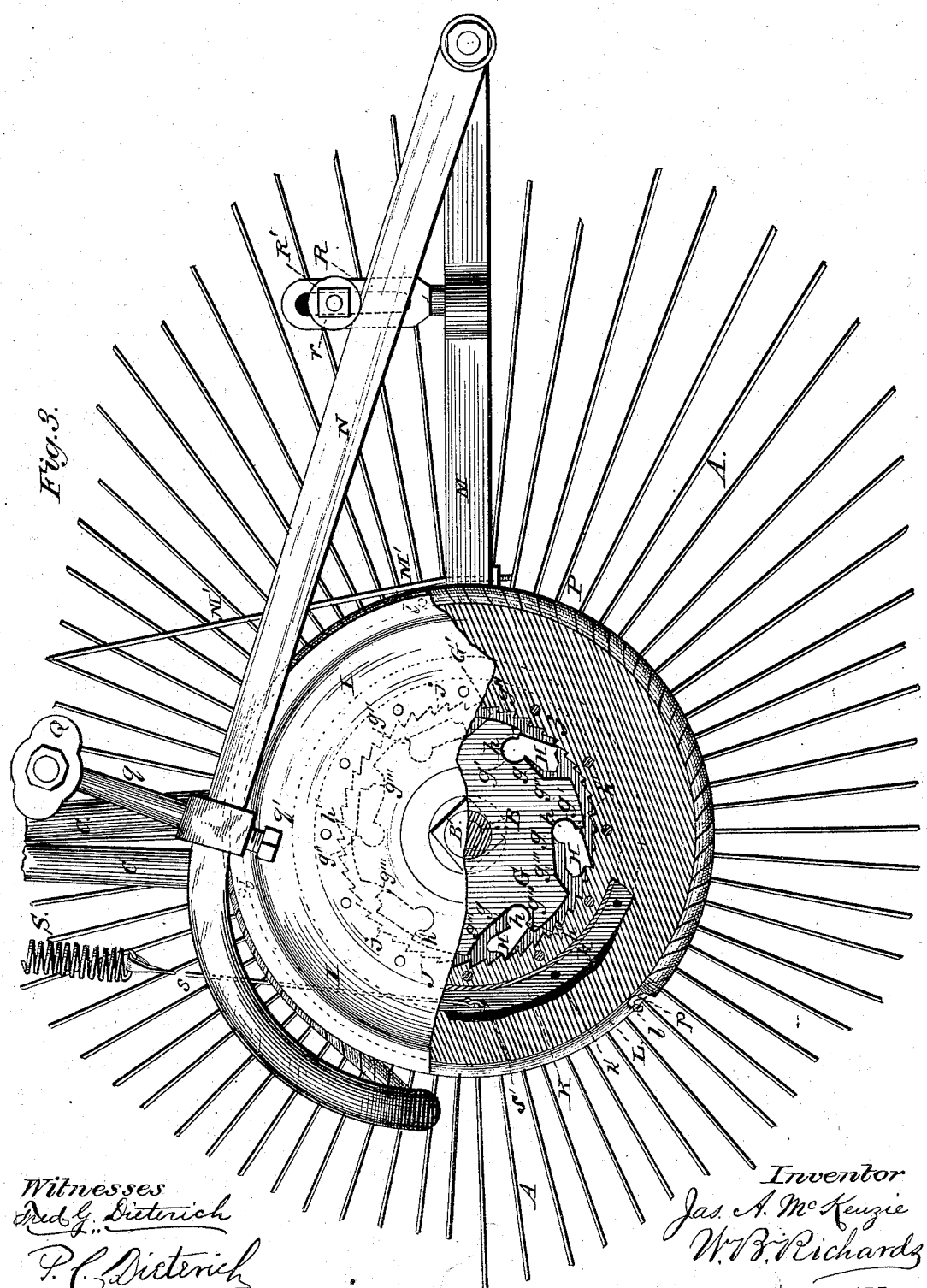

UNITED STATES PATENT OFFICE.

JAMES A. McKENZIE, OF GALESBURG, ILLINOIS.

VELOCIPEDE.

SPECIFICATION forming part of Letters Patent No. 241,395, dated May 10, 1881.

Application filed December 10, 1880. (No model.)

*To all whom it may concern:*

Be it known that I, JAMES A. MCKENZIE, a citizen of the United States, residing at Galesburg, in the county of Knox and State of Illinois, have invented certain new and useful Improvements in Velocipedes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to velocipedes or carriages of that class which are impelled by the rider; and the nature thereof consists in certain improvements in the method of applying the power to the driving-wheel for the purpose of propelling the carriage, hereinafter described.

In the accompanying drawings, which illustrate my invention as applied in a bicycle, the similar letters used as marks of reference apply to the like parts in all of the figures.

Figure 1 is a side elevation of a bicycle with my improvement. Fig. 2 is a horizontal sectional plan in the line $x$ $x$ in Fig. 1. Fig. 3 is an enlarged side elevation of the clutch mechanism, with the central part of the ratchet-disk broken away to show the working parts. Fig. 4 is a sectional plan of the ratchet-disk and the pawl-disk, taken on a line through the axis of the wheel.

The construction and relative arrangement of the parts of the improvement and the adjacent parts of an ordinary bicycle in which said improvements may be incorporated are as follows:

Letter A represents a forward drive-wheel with an axle, B, fixed thereto; C, a steering-head, with bearings C' for the axle B at its lower end, and handles C'' and brake C''' at its upper end; D, a reach, hinged at its upper end to the head C, and carrying at its lower end a back wheel, E, and at its upper portion a seat, F. The foregoing parts, described by reference-letters, constitute parts of an ordinary bicycle, and may be constructed as shown or in any other usual manner.

The ends of the axle B project beyond the bearing-blocks C', and to each outer end of said axle a pawl-bearing disk G is rigidly secured. H are pawls located in recesses $g$ in the outer part of the disk G. Each pawl H has a circular end, $h$, which constitutes a journal, with a bearing in a similarly-shaped hole, $g'$, in the disk G. The outward swing of each pawl H is limited by a shoulder, $h''$, on its outer side, striking a shoulder, $g''$, of the recess $g$, and its inward swing is limited by striking the shoulder $g'''$. The disk G has an annular flange, G', projecting from its side next the wheel A. A disk, I, is connected with each disk G, as follows: The disk I is considerably greater in diameter than the disk G, and has affixed to its side next the disk G a projecting annulus, J, with ratchet-teeth $j$ on its concave or inner side. The disk I has a central hole, $i$, which fits over the end of the axle B projecting through the disk G. A stud-bolt, B', enters the end of the axle and secures the disk I, while it at the same time permits it to rotate on the axle. The ratchet-annulus J surrounds the pawl-disk G in such manner that when either disk I is rotated in same direction that the wheel A rotates to move the bicycle forward the pawls H on the disk G, adjacent to each respective disk I, will engage with the ratchet-teeth on the adjacent annulus J, and thereby cause the wheel A to rotate with the disk I in the direction shown by the arrow at Fig. 1; and this result will follow whether the disks I are rotated forward simultaneously or alternately in the direction stated. The flange G' on the disk G extends over the face of the ratchet-annulus J and serves to exclude dirt and dust therefrom. A peripheral flange, K, projects from the annulus J, so as to form an annular groove, $k$, between it and the disk I. The flange K is pierced with series of holes $k'$. The disks I have each a circumferential groove, L, with series of holes $l$ in the wall of said grooves.

M is an arm rigidly secured to and projecting rearward from the steering-head C, and is braced by a rod, M'.

N is a lever or treadle hinged or journaled at its rear end to the rear end of the arm M, and its other end bent inward and downward into close proximity to the front side of the disk I, and preferably slightly above the center of said disk when in its normal position, as shown at Figs. 1 and 3. A flexible cord-belt, P, is connected at one end with the distal end of the treadle N, and extends nearly around the disk I, in the groove L, and has at its other end a hook, *p*, which may be engaged with either of the series of holes *l*.

Q is a foot-rest supported on a standard, *q*, which can be adjusted forward and rearward on the treadle N, and may be held after adjustment by a set-screw, *q'*.

R is a slotted standard on the arm M.

R' is a stop projecting through and from the arm M, on which it may be adjusted vertically or in higher and lower planes and held after adjustment by a nut, *r*.

S is a spiral spring, attached at its upper end to the upper end of the steering-head C, and at its lower end to a flexible belt or strap, *s*, which extends nearly around the annulus J, in the groove *k*, and is secured thereto by a hook, *s'*, on its end, which engages with either of the series of holes *k'*.

There are a treadle, N, and arm M, with their connected parts, hereinbefore described, to each disk I, and the operator, with one of his feet resting on each treadle, may, by forcing either treadle downward while the other remains stationary or while it is passing upward or by forcing both treadles downwardly at the same time cause the cord or cords P to rotate the disk or disks I forward, and thereby rotate the traction-wheel A and propel the bicycle forward in the evident manner. When either treadle is forced downward the spring S, adjacent, will retract it and return it to its normal position by rotating the disk I backward on restraining the force of the foot downward on the treadle. When the disk I is rotated backward by the spring S the ratchet-teeth thereon will not engage with, but slide over, the pawls on the disk G.

It will be seen that the wheel A may rotate while either or both treadles N are stationary or at any point in the path or at the limits of their strokes by the pawls H sliding backward over the ratchet-teeth and not engaging therewith. The swing or stroke of the treadle downward will be limited by the length of the operator's leg, and their swing or stroke upward is limited by the adjustment of the stops R'.

The standard *q* may be adjusted forward on the treadle to give more extended movement of the operator's foot, with an increase of force on the disk I, or adjusted rearward for a converse purpose.

Clutch mechanism of other kind or construction from that I have herein described may be used, and my treadle and cord-belt be adapted thereto.

I am aware that it is common in velocipedes to have an axle fixed to the driving-wheel, an oscillating treadle, a clutch mechanism on the axle, and a cord or belt connecting the treadle and clutch mechanism in such manner that the movement of the lever in one direction will impart movement to the driving-wheel, and a spring adapted to retract the treadle after each movement given to it by the foot of the operator, and such I do not wish to be understood as claiming, broadly, as of my invention.

What I claim is—

1. In a velocipede, the combination, with a driving-wheel fixed on the axle, of the disk G, fixed to the axle, and having the flange G', and carrying a series of pawls, H, and the disk I, journaled on the axle, and having an interior ratchet-annulus, and means, substantially as described, for operating said disk, and through the medium of which the driving-wheel is operated, substantially as and for the purpose herein shown and described.

2. The combination, with an axle fixed to the driving-wheel, a clutch mechanism on the axle, a propelling cord or belt, and a retracting-spring, of a lever or treadle having one end pivoted in rear of said axle, with its other end bent inward and downward into close proximity to the front side of the disk I, and to which the cord or belt is connected, substantially as and for the purpose herein shown and described.

3. In a velocipede, the combination, with a disk journaled on the axle, and having a ratchet-annulus, of the disk G, fixed to the axle, and having a series of recesses, *g*, constructed substantially as shown, and a series of loose pawls arranged in said recesses *g*, substantially as and for the purpose herein shown and described.

4. In a velocipede, the combination, with a disk, I, journaled on the axle, and having a ratchet-annulus, of the disk G, fixed to the axle, and having a series of recesses, *g g'*, and shoulders *g'' g'''*, and a series of loose pawls arranged in said recesses, and having a circular end, *h*, and shoulder *h''*, substantially as and for the purpose herein shown and described.

5. In a velocipede, the combination, with a pivoted treadle, of the foot-rest adapted to slide on said treadle, and secured in any desired position by a set-screw, substantially as and for the purpose herein shown and described.

6. In combination with a treadle adapted to propel a velocipede, an adjustable stop, R', adapted to limit the upward movement of the treadle, substantially as and for the purpose specified.

7. In a velocipede, the combination, with the pawl-disk fixed to the axle, and a propelling cord or belt, of an intermediate disk, I, having a ratchet-annulus, and a grooved periphery, with a series of adjusting-holes, *l*, substantially as and for the purpose specified.

8. In a velocipede, the combination, with the pawl-disk fixed to the axle, of a disk having a ratchet-annulus, and a grooved periphery, *k*, having a series of adjusting-holes, *k'*, and a retracting-spring having a flexible belt or strap, *s*, provided with a hook, *s'*, substantially as and for the purpose herein shown and described.

In testimony whereof I affix my signature in presence of two witnesses.

J. A. McKENZIE.

Witnesses:
W. C. CALKINS,
A. H. KRAUSE.